(12) United States Patent
Gannon et al.

(10) Patent No.: US 10,580,308 B2
(45) Date of Patent: Mar. 3, 2020

(54) CONNECTED INSTRUMENT PROCEDURE PLACEKEEPING SYSTEM

(71) Applicant: HONEYWELL INTERNATIONAL INC., Morris Plains, NJ (US)

(72) Inventors: Aaron James Gannon, Anthem, AZ (US); Ivan Sandy Wyatt, Scottsdale, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 1 day.

(21) Appl. No.: 15/968,050

(22) Filed: May 1, 2018

(65) Prior Publication Data

US 2019/0340932 A1 Nov. 7, 2019

(51) Int. Cl.
*G08G 5/00* (2006.01)
*G06F 3/147* (2006.01)
(Continued)

(52) U.S. Cl.
CPC ............. *G08G 5/003* (2013.01); *B64D 43/00* (2013.01); *G01C 21/00* (2013.01); *G06F 3/147* (2013.01);
(Continued)

(58) Field of Classification Search
CPC .... H04L 67/12; G08G 5/0026; G08G 5/0013; G08G 5/003; G08G 5/0039; G01C 23/005;
(Continued)

(56) References Cited

U.S. PATENT DOCUMENTS 6,401,013 B1 6/2002 McElreath
7,437,220 B2 10/2008 Stefani
(Continued)

FOREIGN PATENT DOCUMENTS

WO 2014018191 A1 1/2014

OTHER PUBLICATIONS

Qantas becomes a launch customer for Airbusa[euro](tm) iPad Electronic Flight Bag solution; Combining Airbusa[euro] (tm) EFB content with the iPad portable device; M2 Presswire Nov. 29, 2012.
(Continued)

*Primary Examiner* — Richard J Hong
(74) *Attorney, Agent, or Firm* — Lorenz & Kopf, LLP

(57) ABSTRACT

A connected instrument procedure placekeeping system includes a navigation database, a flight deck display, a flight deck processor, and an electronic device. The flight deck processor is in operable communication with the navigation database and the flight deck display and selectively retrieves flight plan data from the navigation database. The flight deck processor causes the flight deck display to render images of an instrument procedure. The electronic device is in operable communication with the flight deck processor and simultaneously renders an image of a published representation of the instrument procedure. One of either the flight deck processor or the electronic device is responsive to user input signals to highlight a waypoint and its associated constraint and the other of the electronic device or the flight deck processor simultaneously highlights the waypoint and its associated constraint for ease of comparison.

17 Claims, 12 Drawing Sheets

(51) Int. Cl.
  *G06T 11/60* (2006.01)
  *B64D 43/00* (2006.01)
  *G01C 21/00* (2006.01)
  *G06F 16/29* (2019.01)
  *G06F 3/0482* (2013.01)
  *G06F 3/0488* (2013.01)

(52) U.S. Cl.
  CPC ............. *G06F 16/29* (2019.01); *G06T 11/60* (2013.01); *G06F 3/0482* (2013.01); *G06F 3/04886* (2013.01); *G06T 2200/24* (2013.01)

(58) Field of Classification Search
  CPC ......... G01C 23/00; G01C 21/00; G06F 3/147; G06F 16/29; G06F 3/0482; G06F 3/04886; G06F 3/0486; G06F 3/04815; G06T 11/60; G06T 2200/24; G64D 43/00; B64C 19/00
  See application file for complete search history.

(56) References Cited

U.S. PATENT DOCUMENTS

| | | | |
|---|---|---|---|
| 7,970,531 B2 | 6/2011 | Masson | |
| 8,160,759 B2* | 4/2012 | Baker | G01C 21/00 340/951 |
| 8,364,328 B2 | 1/2013 | Hedrick | |
| 8,660,715 B2* | 2/2014 | Nicolas | G08G 5/0039 701/3 |
| 9,007,327 B1 | 4/2015 | Raghu et al. | |
| 9,019,128 B1* | 4/2015 | Kim | G01C 23/00 340/945 |
| 9,032,319 B1* | 5/2015 | Hammack | G06F 3/0486 715/769 |
| 9,141,830 B2 | 9/2015 | Uczekaj et al. | |
| 9,443,433 B1 | 9/2016 | Ruth et al. | |
| 9,534,922 B1* | 1/2017 | McCusker | G01C 23/00 |
| 9,563,580 B2 | 2/2017 | Warner et al. | |
| 9,650,153 B2 | 5/2017 | Hathaway | |
| 9,697,737 B2 | 7/2017 | Hale et al. | |
| 9,703,476 B1 | 7/2017 | Pappas et al. | |
| 9,710,145 B2 | 7/2017 | Zammit-Mangion et al. | |
| 9,714,081 B1* | 7/2017 | Hall, III | B64C 19/00 |
| 2004/0148065 A1* | 7/2004 | Andrews | G08G 5/0013 701/3 |
| 2005/0137758 A1* | 6/2005 | He | G01C 23/005 701/3 |
| 2010/0191458 A1* | 7/2010 | Baker | G01C 21/00 701/533 |
| 2014/0074323 A1* | 3/2014 | Andre | G06F 3/04815 701/3 |
| 2014/0365040 A1 | 12/2014 | Srivastav et al. | |
| 2015/0338237 A1* | 11/2015 | Bonamy | G01C 23/005 340/973 |
| 2016/0093217 A1* | 3/2016 | Hale | G08G 5/0026 701/120 |
| 2016/0093222 A1* | 3/2016 | Hale | G08G 5/0039 701/120 |
| 2017/0251501 A1* | 8/2017 | Batsakes | H04L 67/12 |

OTHER PUBLICATIONS

Aviator From Jeppesen Integrates EFB Apps in Single Framework; PR Newswire Feb. 14, 2017.

* cited by examiner

CONNECTED INSTRUMENT PROCEDURE PLACEKEEPING SYSTEM

TECHNICAL FIELD

The present invention generally relates to aircraft instrument procedure reviews, and more particularly relates to a system that facilitates this review by provided connected instrument procedure placekeeping.

BACKGROUND

Before a flight crew commences any type of instrument procedure, including departures, arrivals, and approaches, the pilot or flight crew (depending upon whether it is a single or multiple pilot aircraft) performs a review to confirm that the approach presently loaded in the flight management system (FMS) (e.g., the FMS data) complies with the published instrument procedure chart (e.g., the charted data). This review is relatively important for several reasons. For example, though highly unlikely, such a review can reveal potential database errors, old database installations, off-cycle chart updates, crew loading errors, disconnects between the visual approach plate and the FMS plan-to-fly, and communication errors between Air Traffic Control (ATC) and the flight crew.

Currently, in a single pilot aircraft, a confirmation review between the FMS data and charted data is conducted by the pilot looking down at the published instrument procedure chart, finding applicable information, looking up, searching, locating, and finding the equivalent FMS data, looking down, confirming values, maintaining his/her place, looking up, maintaining his/her place, and confirming values. This cross-check confirmation occurs for each waypoint in the instrument procedure, and for each constraint (e.g., vertical constraints, speed limits) associated with each waypoint.

In a multi-pilot environment, a confirmation review is conducted by dividing responsibilities across crewmembers. For example, in an airline environment, one crewmember is assigned the FMS, while the other is assigned the published instrument procedure chart. Verbal coordination between crewmembers is used to keep place, advance to the next waypoint, read constraints, and confirm constraints.

In both the single pilot and multi-pilot environments, there exists the potential for miscommunication, placekeeping error, misreading, human memory lapses, task interruptions, and various other sources of potential human error.

Hence, there is a need for a system and method for providing instrument procedure placekeeping that can at least significantly reduce the likelihood of miscommunications, placekeeping errors, human memory lapses, task interruptions, and various other sources of potential error. The present invention addresses at least this need.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a connected instrument procedure placekeeping system includes a navigation database, a flight deck display, a flight deck processor, and an electronic device. The navigation database has flight plan data stored therein. The flight deck display is coupled to receive image rendering display commands and is configured, in response thereto, to render images. The flight deck processor is in operable communication with the navigation database and the flight deck display. The flight deck processor is configured to selectively retrieve flight plan data from the navigation database. The retrieved flight plan data is representative of an instrument procedure that includes a plurality of waypoints and constraints. The flight deck processor is further configured to supply image rendering display commands to the flight deck display that causes the flight deck display to render images of the instrument procedure. The electronic device is in operable communication with the flight deck processor and is configured to simultaneously render an image of a published representation of the instrument procedure that is being rendered on the flight deck display. One of either the flight deck processor or the electronic device is responsive to user input signals to (i) cause a waypoint and its associated constraint of the rendered instrument procedure to be highlighted and (ii) supply data representative of the highlighted waypoint and its associated constraint to the other of the electronic device or the flight deck processor, respectively. The other of the electronic device or the flight deck processor is responsive to the supplied data to cause the waypoint and its associated constraint of the rendered instrument procedure to be simultaneously highlighted for ease of comparison.

In another embodiment, a connected instrument procedure placekeeping system includes a navigation display, a flight deck display, a flight deck processor, and a hand-held personal electronic device (PED). The navigation database has flight plan data stored therein. The flight deck display is coupled to receive image rendering display commands and is configured, in response thereto, to render images. The flight deck processor is in operable communication with the navigation database and the flight deck display. The flight deck processor is configured to selectively retrieve flight plan data from the navigation database. The retrieved flight plan data is representative of an instrument procedure that includes a plurality of waypoints and constraints. The flight deck processor is further configured to supply image rendering display commands to the flight deck display that causes the flight deck display to render images of the instrument procedure. The hand-held PED includes a device display and is in operable communication with the flight deck processor and is configured to simultaneously render, on the device display, an image of a published representation of the instrument procedure that is being rendered on the flight deck display. The hand-held PED is responsive to user input signals to (i) cause a waypoint and its associated constraint of the rendered instrument procedure to be highlighted and (ii) supply data representative of the highlighted waypoint and its associated constraint to the flight deck processor. The flight deck processor is responsive to the supplied data to cause the waypoint and its associated constraint of the rendered instrument procedure to be simultaneously highlighted on the flight deck display for ease of comparison.

In yet another embodiment, a connected instrument procedure placekeeping system includes a navigation database, a flight deck display, a flight deck processor, and an electronic device. The navigation database has flight plan data stored therein. The flight deck display is coupled to receive image rendering display commands and is configured, in response thereto, to render images. The flight deck processor is in operable communication with the navigation database and the flight deck display. The flight deck processor is configured to selectively retrieve flight plan data from the navigation database. The retrieved flight plan data is representative of an instrument procedure that includes a plurality of waypoints and constraints. The flight deck processor is further configured to supply image rendering display commands to the flight deck display that causes the flight deck display to render images of the instrument procedure. The electronic device is in operable communication with the flight deck processor and is configured to simultaneously render an image of a published representation of the instrument procedure that is being rendered on the flight deck display. The flight deck processor is responsive to user input signals to (i) cause a waypoint and its associated constraint of the rendered instrument procedure to be highlighted and (ii) supply data representative of the highlighted waypoint and its associated constraint to the electronic device. The electronic device is responsive to the supplied data to cause the waypoint and its associated constraint of the rendered instrument procedure to be simultaneously highlighted on the display device for ease of comparison.

Furthermore, other desirable features and characteristics of the connected instrument procedure placekeeping system will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
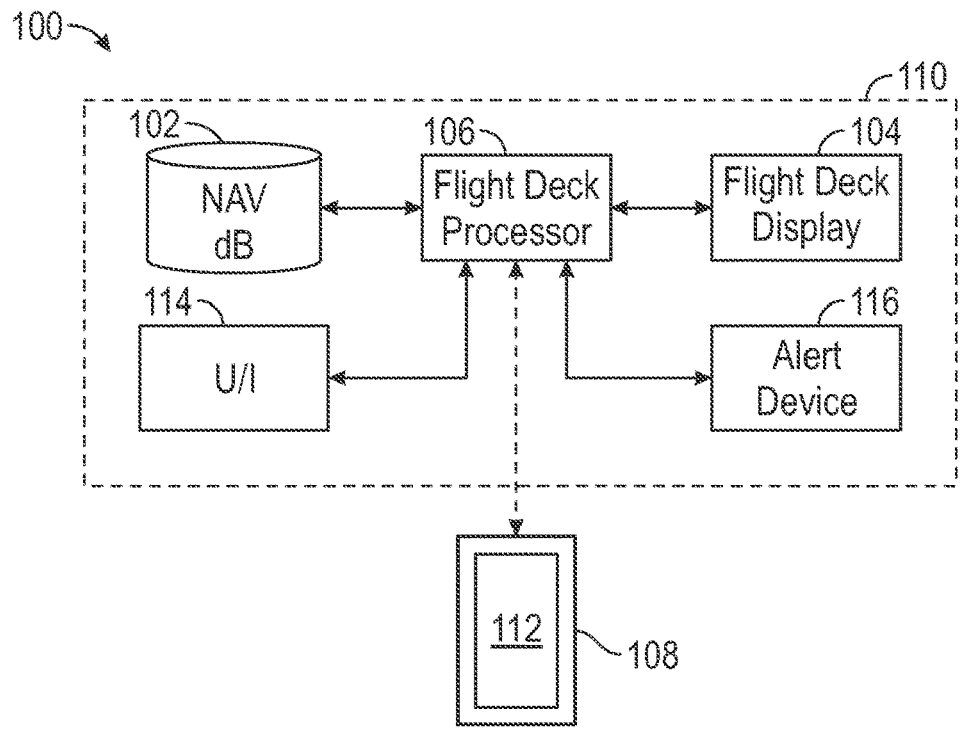
FIG. 1 depicts a functional block diagram of one embodiment of a connected instrument procedure placekeeping system.

Referring now to FIG. 1, a functional block diagram of one embodiment of a connected instrument procedure placekeeping system is depicted. The depicted system 100 includes a navigation database 102, a flight deck display 104, a flight deck processor 106, and an electronic device 108. The navigation database 102, flight deck display 104, and flight deck processor 106 are typically installed in an aircraft 110. The electronic device 108 may be a device that is installed in the aircraft 110, or it may be a portable device that a pilot/flight crew member may transport into and out of the aircraft 110, as needed or desired.

The navigation database 102 includes various types of navigation-related data. These navigation-related data include at least flight plan data such as, for example, waypoints and the associated constraint (e.g., vertical constraints, speed limits), distances between waypoints, headings between waypoints, data related to different airports, navigational aids, obstructions, special use airspace, political boundaries, communication frequencies, and aircraft approach information. It will be appreciated that, although the navigation database 102 is, for clarity and convenience, shown as being stored separate from the flight deck processor 106, all or portions thereof could be loaded into, or integrally formed as part of, the flight deck processor 106, and/or in on-board RAM and/or ROM. The navigation database 102 could also be part of a device or system that is physically separate from the depicted system 100.

The flight deck display 104 is coupled to receive image rendering display commands and is configured, in response thereto, to render various images and data, in both a graphical and a textual format, and to supply visual feedback to a user. It will be appreciated that the flight deck display 104 may be any one of numerous known displays suitable for rendering image and/or text data in a format viewable by a user. Non-limiting examples of such displays include various cathode ray tube (CRT) displays, and various flat panel displays such as, various types of LCD (liquid crystal display), LED (light emitting diode), and TFT (thin film transistor) displays, just to name a few. The flight deck display 104 may additionally be based on a panel mounted display, a HUD projection, a touchscreen display device that is responsive to user input, or any of numerous known display technologies. In an exemplary embodiment, the flight deck display 104 includes a panel display, which may, in some embodiments, be a touchscreen device, and is implemented as a multi-function display. In another embodiment. To provide a more complete description of the method that is implemented by the system 100, a general description of one embodiment of the flight deck display 104 and its layout will now be provided.

Figure 2:
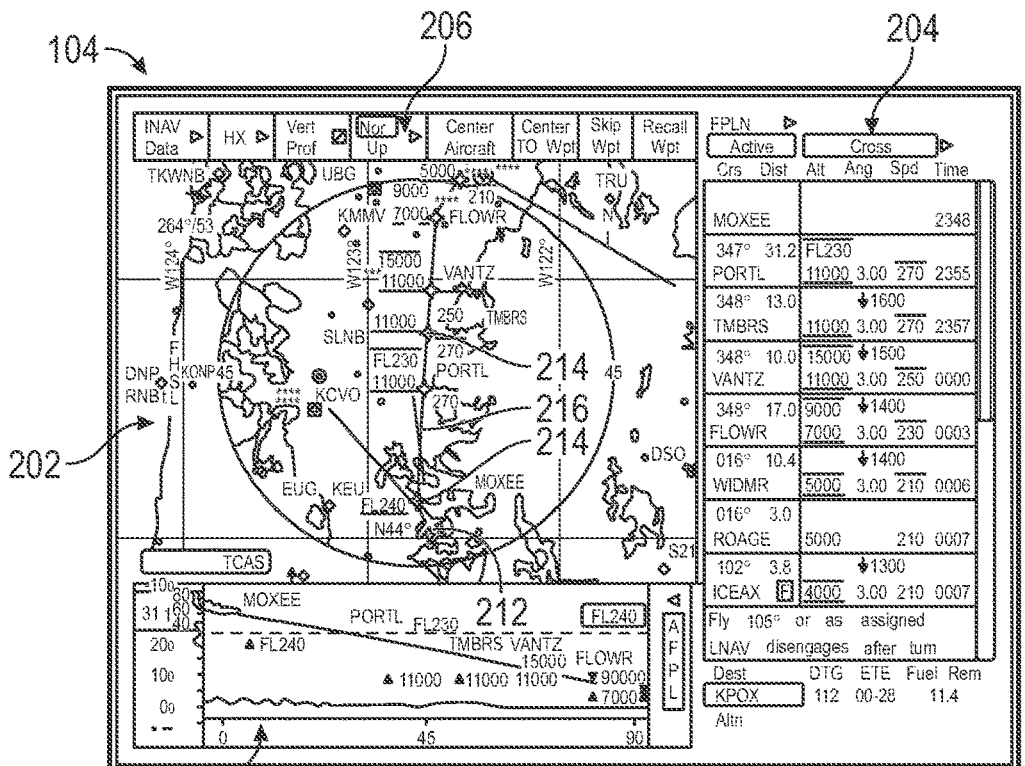
FIG. 2 depicts one embodiment of a flight deck display of the system of FIG. 1, and that is implemented as a multi-function display.

With reference to FIG. 2, it seen that the depicted flight deck display 104 is implemented as a multi-function display and thus includes a display area 202 in which multiple graphical and textual images may be simultaneously displayed, preferably in different sections of the display area 202. For example, flight plan data 204, a lateral situation display 206, and a vertical situation display 208 may be displayed simultaneously, alone, or in various combinations, in various sections of the display area 202. The flight plan data 204 that is displayed may include various types of data related to the flight plan of the aircraft. Such data includes, but is not limited to, a waypoint list (including associated constraints), and various other data such as bearing and time to arrive, just to name a few. It will be appreciated that the general flight plan data 204 may additionally include various other types of data that are not depicted or described herein.

The lateral situation display 206 includes a top-view aircraft symbol 212, and a flight plan 210 represented by one or more waypoint symbols 214 and interconnecting line segments 216. The depicted lateral situation display 206 may also include one or more more range rings 218. The depicted lateral situation display 206 also includes various map features including, but not limited to, a lateral two-dimensional view of terrain 220 below the flight plan, political boundaries, and navigation aids. It will be appreciated that for clarity only the terrain 220 map feature is shown in FIG. 2.

The vertical situation display 208 also provides a view of the terrain 220. The vertical situation display 208 may provide the view of the terrain 220 below the flight plan and/or ahead of the aircraft, and may show the terrain 220 and various other symbols and/or data (discussed further below) as either a two-dimensional profile vertical situation view or a perspective vertical situation view. In the depicted embodiment, the terrain 220 is displayed below the aircraft and as a two-dimensional profile vertical situation view. It will be appreciated that the lateral situation display 206 and the vertical situation display 208 preferably uses the same scale so that the pilot can easily orient the present aircraft position to either section of the display area 202.

It was noted above that the flight plan data 204, the lateral situation display 206, and the vertical situation display 208 may be displayed in various combinations. Hence, before proceeding further with the description, it should be noted that, although in each of the figures referenced below the flight-related data 204, the lateral situation display 206, and the vertical situation display 208 are shown as being simultaneously displayed together in the display area 202 of the flight deck display 104, in other embodiments this may not be the case.

Returning to FIG. 1, the flight deck processor 106 is in operable communication with at least the navigation database 102 and the flight deck display 104. The flight deck processor 106 is configured to selectively retrieve flight plan data from the navigation database 102 and is further configured to supply image rendering display commands to the flight deck display 104 that causes the flight deck display 104 to render one or more of the above-described images. The flight deck processor 106 may be implemented or realized with a general-purpose processor, a content addressable memory, a digital signal processor, an application specific integrated circuit, a field programmable gate array, any suitable programmable logic device, discrete gate or transistor logic, processing core, discrete hardware components, or any combination thereof, designed to perform the functions described herein.

The flight deck processor 106 may also be implemented as a combination of computing devices, e.g., a plurality of processing cores, a combination of a digital signal processor and a microprocessor, a plurality of microprocessors, one or more microprocessors in conjunction with a digital signal processor core, or any other such configuration. In practice, the flight deck processor 106 may include processing logic that may be configured to carry out the functions, techniques, and processing tasks associated with the operation of the system 100, as described in greater detail below. Furthermore, the steps of a method or algorithm described in connection with the embodiments disclosed herein may be embodied directly in hardware, in firmware, in a software module executed by the flight deck processor 106, or in any practical combination thereof. For example, the flight deck processor 106 may include or otherwise access a data storage element (not depicted) that stores code or other computer-executable programming instructions that, when read and executed by the flight deck processor 106, causes the flight deck processor 106 to generate, implement, or otherwise execute applications that support or otherwise performs certain tasks, operations, functions, and/or processes described herein.

The electronic device 108 is in operable communication with the flight deck processor 106 and, as noted above, it may be implemented using a device that is installed in the aircraft 110 or it may be implemented using a portable device. For example, if it is implemented using a device that is installed in the aircraft 110, the electronic device 108 may be another flight deck display unit, separate from flight deck display 104. If it is implemented using a portable device, the electronic device 108 may be implemented using any one of numerous types of hand-held personal electronic devices (PEDs). Some non-limiting examples include any one of numerous smartphones, tablet computer devices, and electronic flight bags.

In the depicted embodiment, the electronic device 108 is implemented using a hand-held PED 108. The depicted hand-held PED 108 is in operable communication with the flight deck processor 106 via a wireless communication protocol. It will be appreciated, however, that the hand-held PED 108 may be in operable communication with the flight deck processor 106 via any one of numerous wired connections. It will additionally be appreciated that the wireless communication protocol that is used may be any one of numerous wireless communication protocols.

Figure 3:
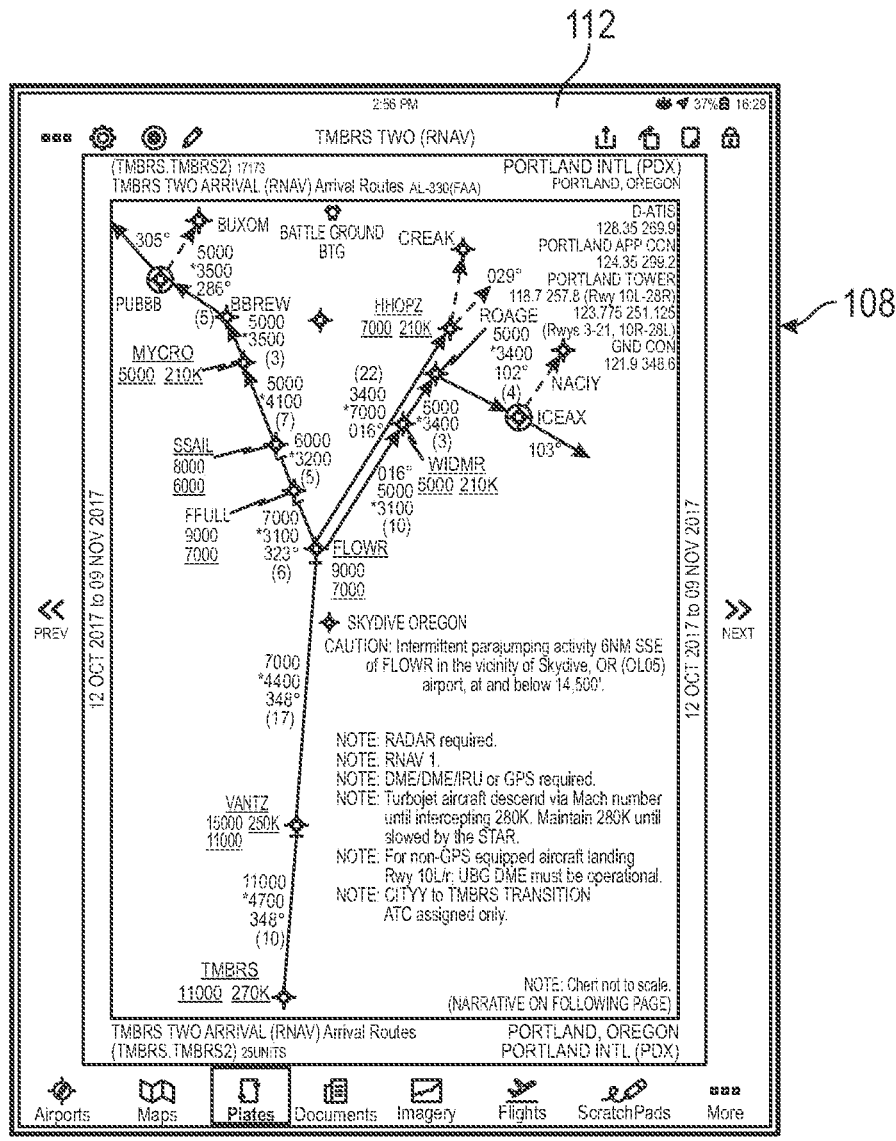
FIG. 3 depicts one embodiment of a hand-held personal electronic device that may be used to implement the system of FIG. 1, and that is rendering an image of a published n instrument procedure.

Regardless of how the hand-held PED 108 is in communication with the flight deck processor 106, the hand-held PED 108 includes a device display 112 and is configured, among various other functions, to render, on the device display 112, at least an image of a published representation of an instrument procedure. Preferably, and as will be described momentarily, the image is a published representation of the instrument procedure that is being simultaneously rendered on the flight deck display 104. For completeness, one example of an embodiment of the hand-held PED 108 rendering a published representation of an instrument procedure on the device display 112 is depicted in FIG. 3.

Returning to FIG. 1, it is noted that although the device display 112 may be variously implemented, in the depicted embodiment it is configured as a touchscreen display device that is responsive to user input thereon to generate and supply user input signals. It will additionally be appreciated that the hand-held PED 108 may be implemented using any one of numerous types of hand-held computing devices. Some non-limiting examples include any one of numerous smartphones, tablet computer devices, and electronic flight bags.

The connected instrument procedure placekeeping system 100 depicted in FIG. 1 and described above implements a process that provides improved instrument procedure placekeeping. To implement the process, when the aircraft flight plan includes an instrument procedure that needs to be reviewed and confirmed by a pilot or flight crew, the flight deck processor 106 commands the flight deck display 104 to render images of the instrument procedure (e.g., waypoint list 204). Moreover, and as alluded to above, the hand-held PED 108 simultaneously renders, on the device display 112, an image of the published representation of the instrument procedure that is being rendered on the flight deck display 104. It will be appreciated that the hand-held PED 108 may automatically render, on the device display 112, the published representation of the instrument procedure in response to a notification supplied from the flight deck processor 106, or the published representation of the instrument procedure may be rendered in response to user input.

Regardless of the mechanism for rendering the published representation of the instrument procedure, thereafter, and as will be described momentarily, one of either the flight deck processor 106 or the hand-held PED 108 is responsive to user input signals to cause a waypoint (and its associated constraint) to be highlighted, and to supply data representative of the highlighted waypoint and its associated constraint to the other of the hand-held PED 108 or the flight deck processor 106, respectively. Then, the other of the hand-held PED 108 or the flight deck processor 106 is responsive to the supplied data to cause the waypoint and its associated constraint of the rendered instrument procedure to be simultaneously highlighted for ease of comparison.

Referring now to FIGS. 4-8, the above-described general process will be described for when the system 100 is configured such that the hand-held PED 108 is responsive to user input signals to cause a waypoint (and its associated constraint) to be highlighted, and to supply data representative of the highlighted waypoint and its associated constraint to the flight deck processor 106. It will be appreciated that the instrument procedure that the pilot/flight crew is going to commence, and is thus being reviewed and confirmed, is an arrival procedure. More specifically, it is the TMBRS TWO ARRIVAL procedure for the Portland International Airport (PDX).

In the depicted example, the placekeeping process begins by the flight deck processor 106 supplying the loaded instrument approach, including the arrival transitions, to the hand-held PED 108. This provides the hand-held PED 108 with information on the route waypoints that should, and should not, be highlighted as part of the placekeeping process. As FIG. 4-8 depicts, as the pilot/flight crew member traces the arrival procedure using, for example, their finger 402, waypoints and associated constraints along the flight path are highlighted on the published representation of the instrument procedure. Data representative of the highlighted waypoints and associated constraints are transmitted from the hand-held PED 108 to the flight deck processor 106. The flight deck processor 106 is responsive to the supplied data to cause the waypoint and its associated constraint to be simultaneously highlighted for ease of comparison.

Figure 4:
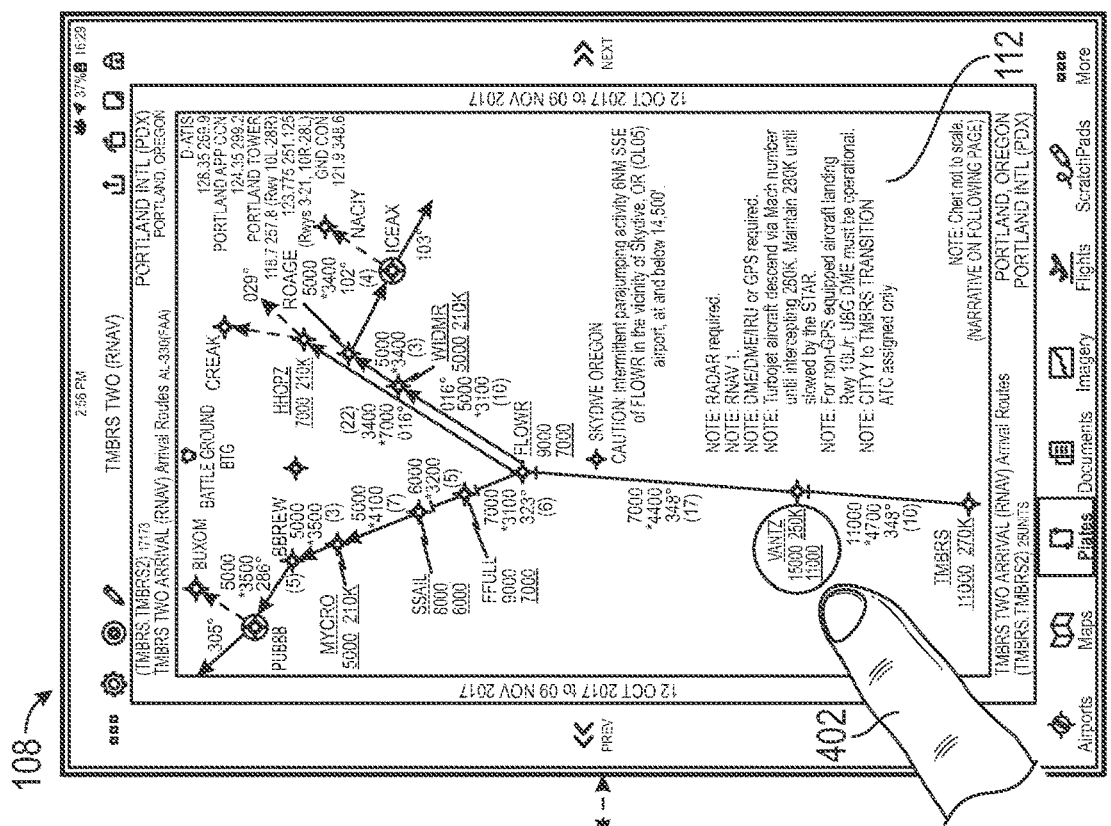
FIGS. 4-8 depict one embodiment of a one-to-one connected placekeeping process that may be implemented by the system of FIG. 1.
Figure 4:
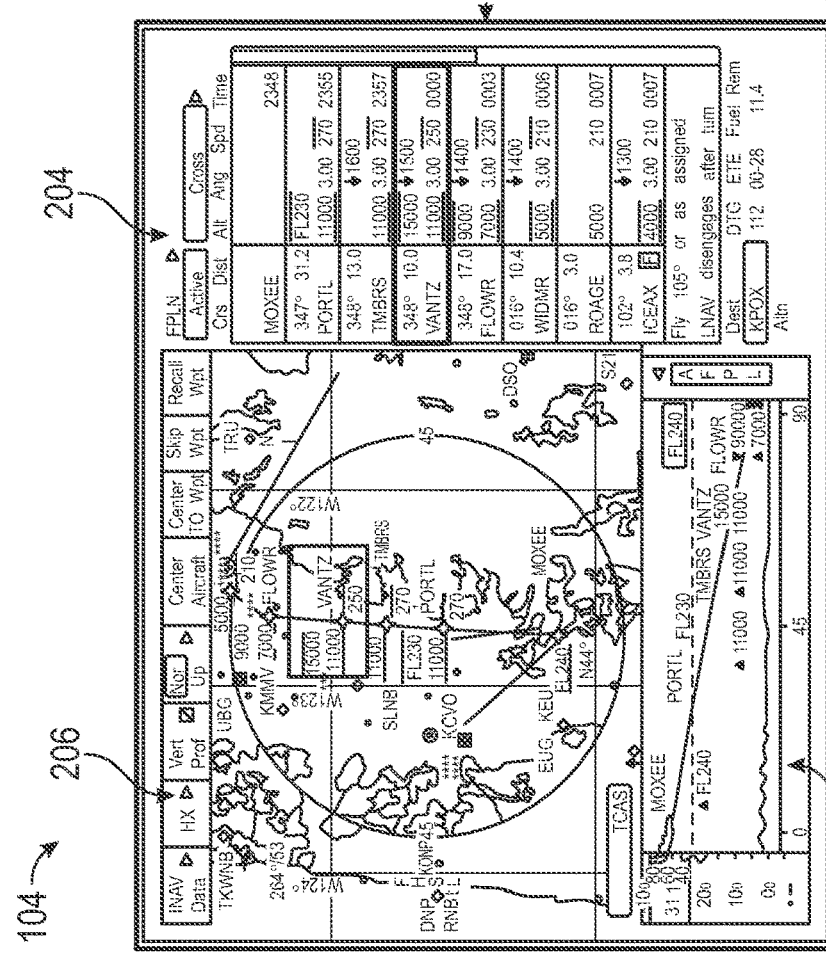
Figure 5:
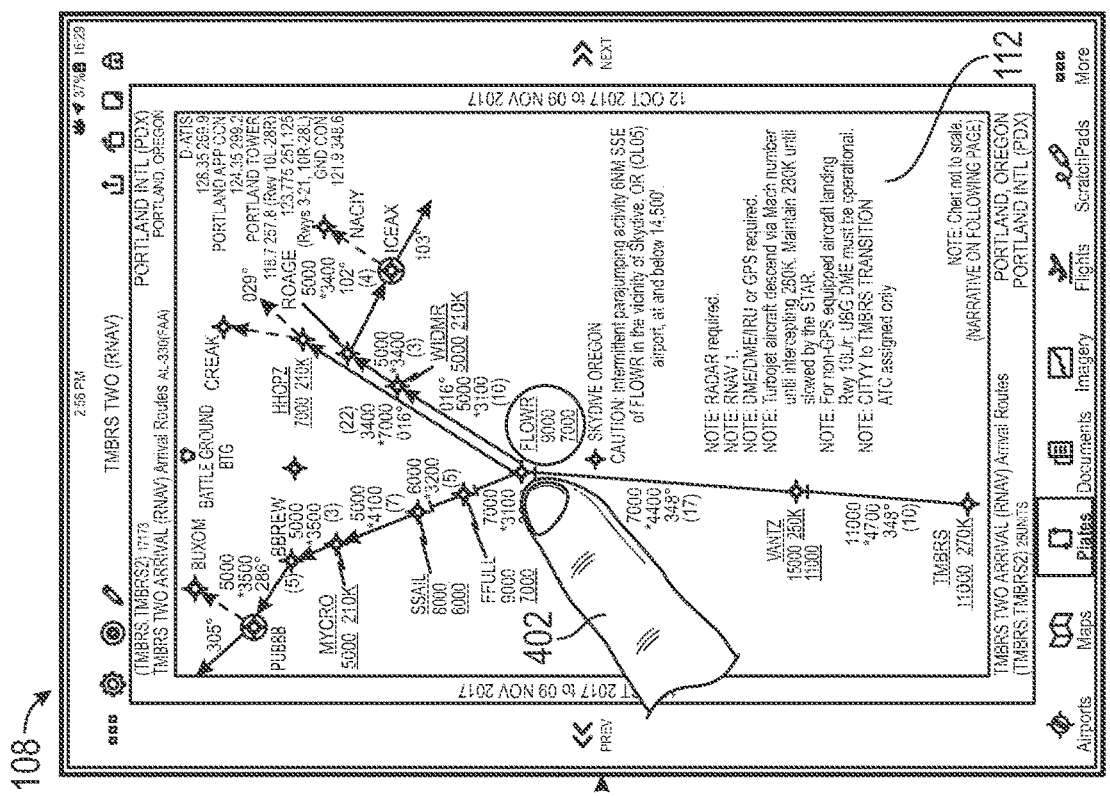
Figure 5:
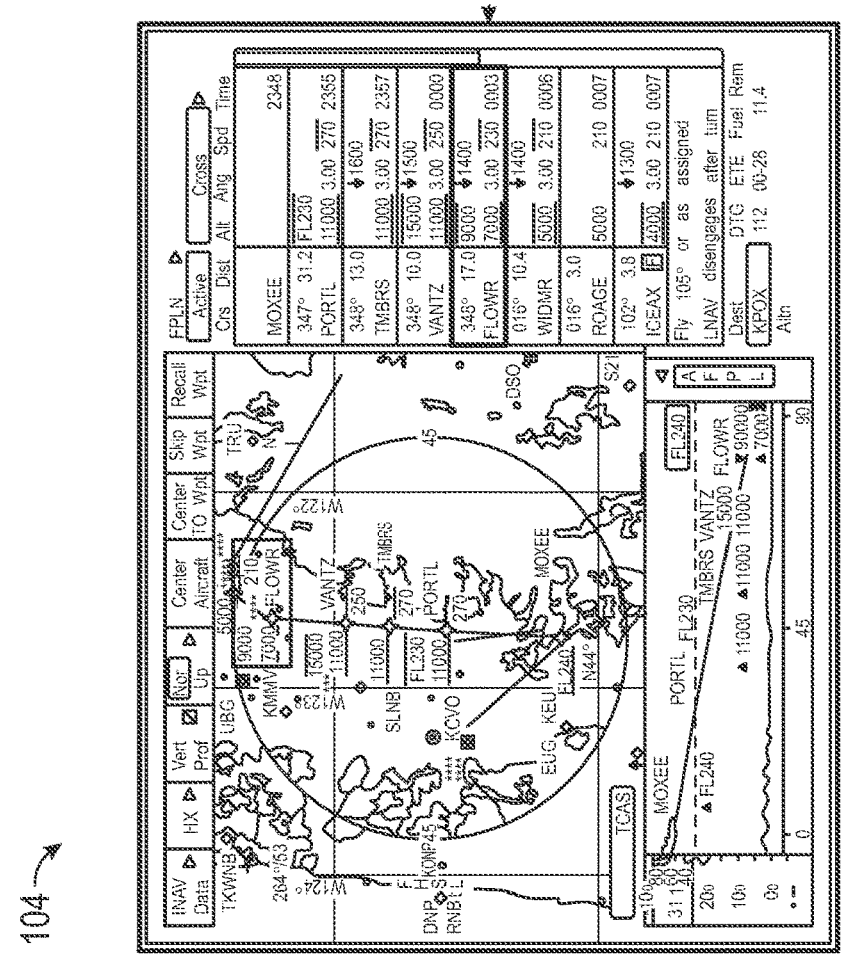
Figure 6:
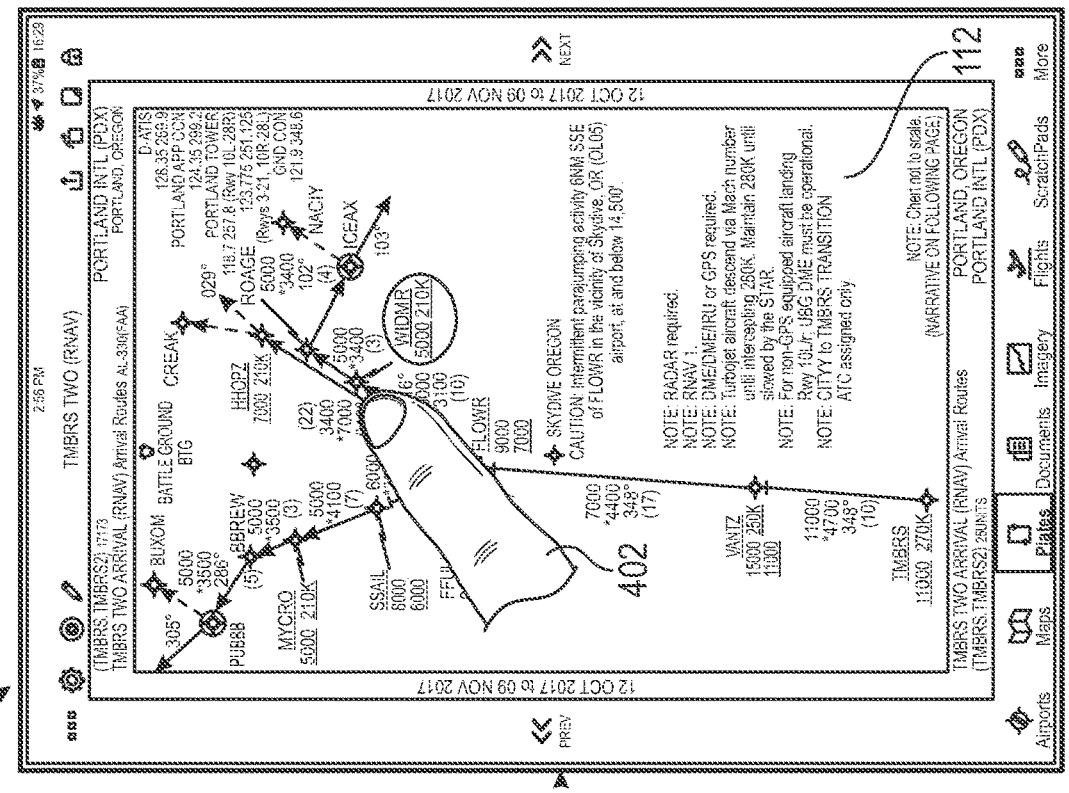
Figure 6:
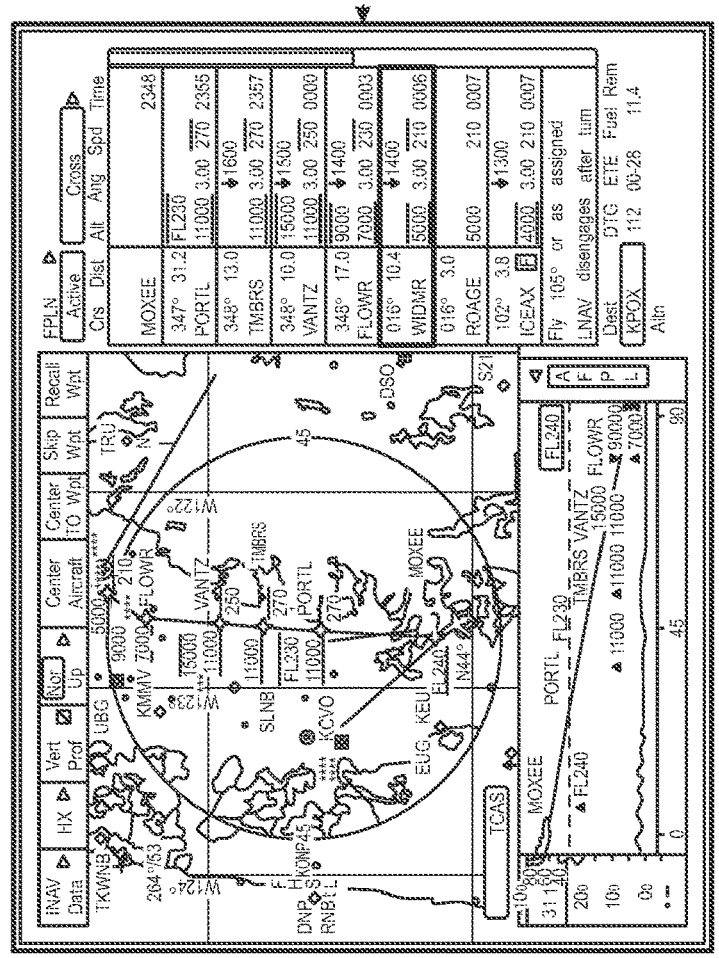
Figure 7:
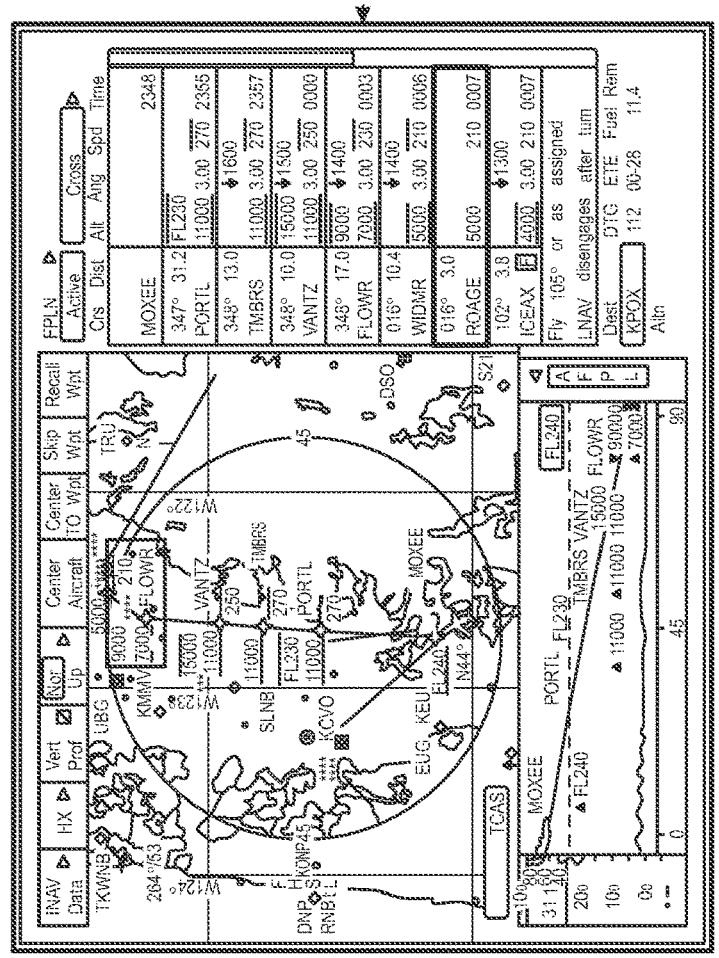
Figure 7:
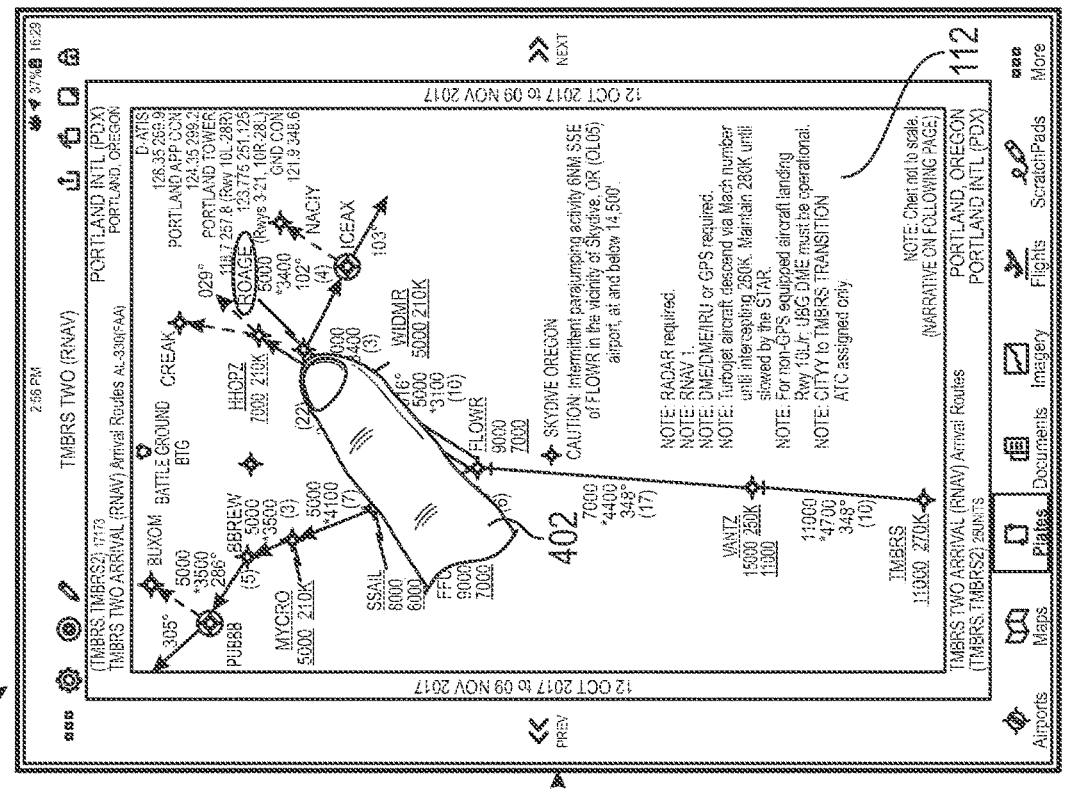
Figure 8:
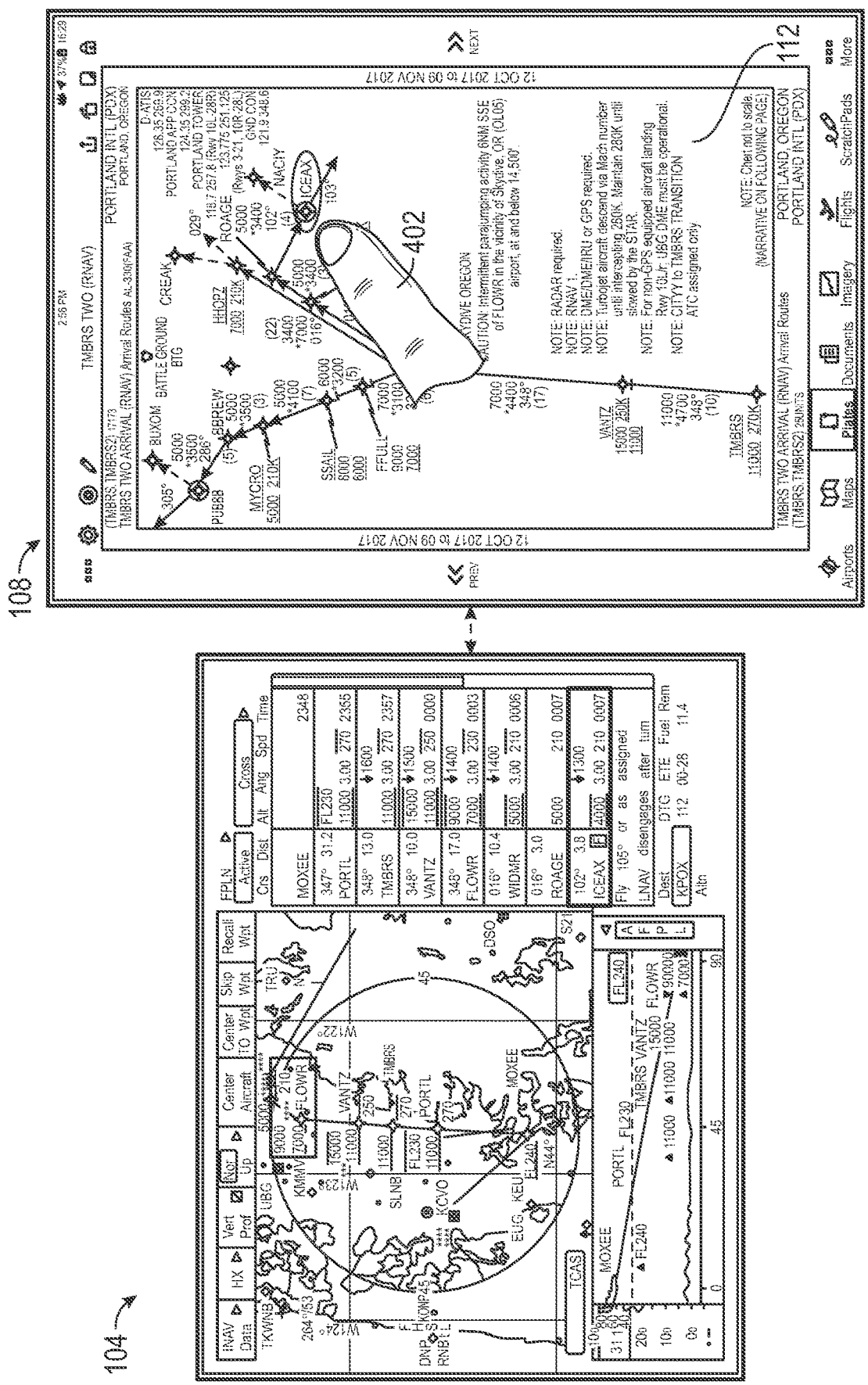

For example, in FIG. 4, the pilot/flight crew first comes to the VANTZ waypoint. This waypoint and its associated constraints are then highlighted on both the device display 112 and on the flight deck display 104. In the depicted embodiment, the VANTZ waypoint and its associated flight constraints are highlighted on at least the waypoint list 204. The waypoint and associated flight constraints may also be highlighted, at least in some embodiments, on either or both of the lateral situation display 206 and the vertical situation display 208. As FIGS. 5-8 illustrate, as the pilot/flight crew continues to move their finger along the flight path, each new waypoint and associated constraints are simultaneously highlighted on the device display 112 and the flight deck display 104, providing a one-to-one connected placekeeping process that fits naturally within the context of current review and confirmation techniques.

In another embodiment, which is depicted in FIGS. 9-13, the the system 100 is configured such that the flight deck processor 106 is responsive to user input signals to cause a waypoint (and its associated constraint) to be highlighted, and to supply data representative of the highlighted waypoint and its associated constraint to the hand-held PED 108. In the embodiment depicted in FIGS. 9-13, the flight deck display 104 is implemented using a touchscreen display, and thus the user input signals supplied to the flight deck processor 106 are generated by the touchscreen display. In other embodiments, and as FIG. 1 depicts, the system 100 may also include a user interface device 114, such as a cursor control device or keyboard (or any one of numerous other devices), to supply the user input signals.

As FIGS. 9-13 depict, as the pilot/flight crew member selects waypoints in the waypoint list 204 using, for example, their finger (or user interface device 114), the waypoints and associated constraints are highlighted in the list. Data representative of the highlighted waypoints and associated constraints are transmitted from the flight deck processor 106 to the hand-held PED 108. The hand-held PED 108 is responsive to the supplied data to cause the waypoint and its associated constraint to be simultaneously highlighted for ease of comparison.

Figure 9:
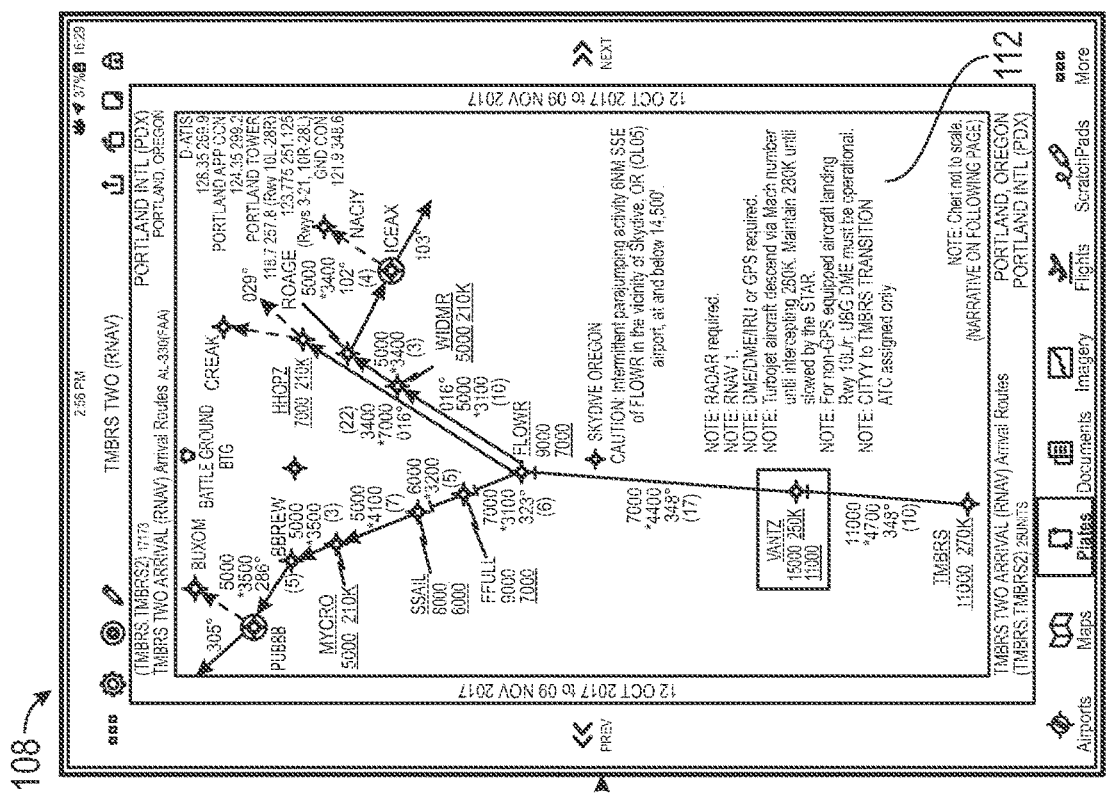
FIGS. 9-13 depict another embodiment of a one-to-one connected placekeeping process that may be implemented by the system of FIG. 1.
Figure 9:
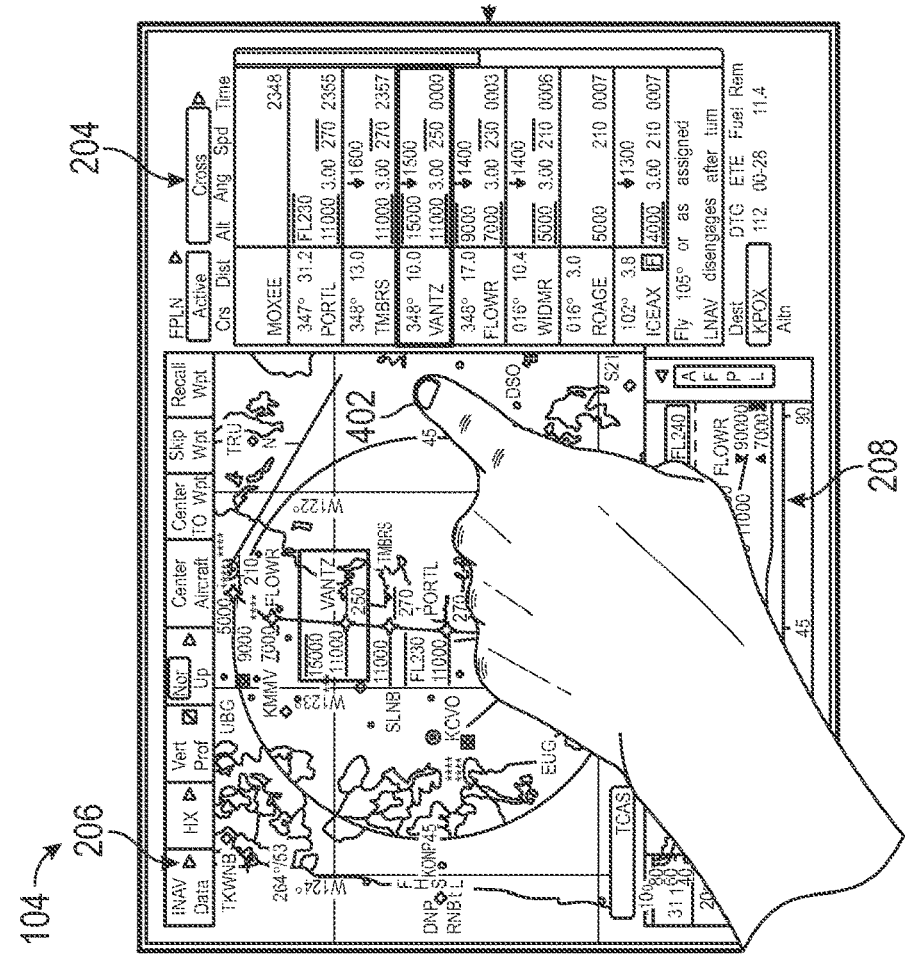
Figure 10:
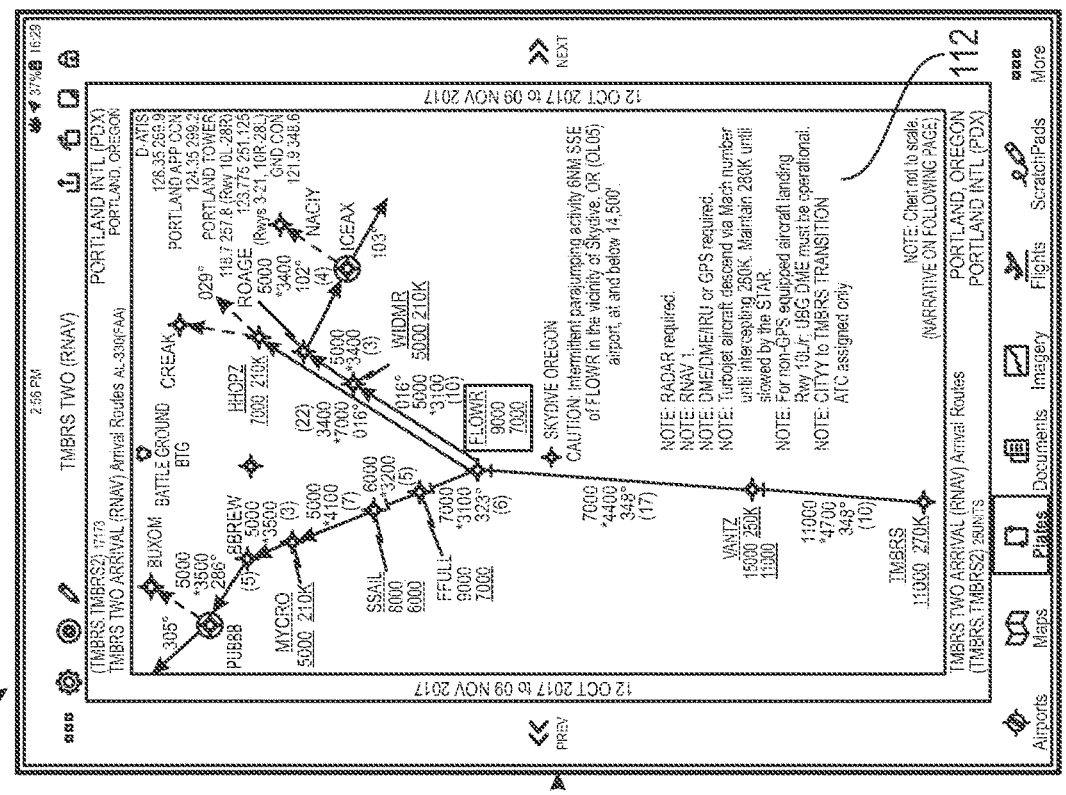
Figure 10:
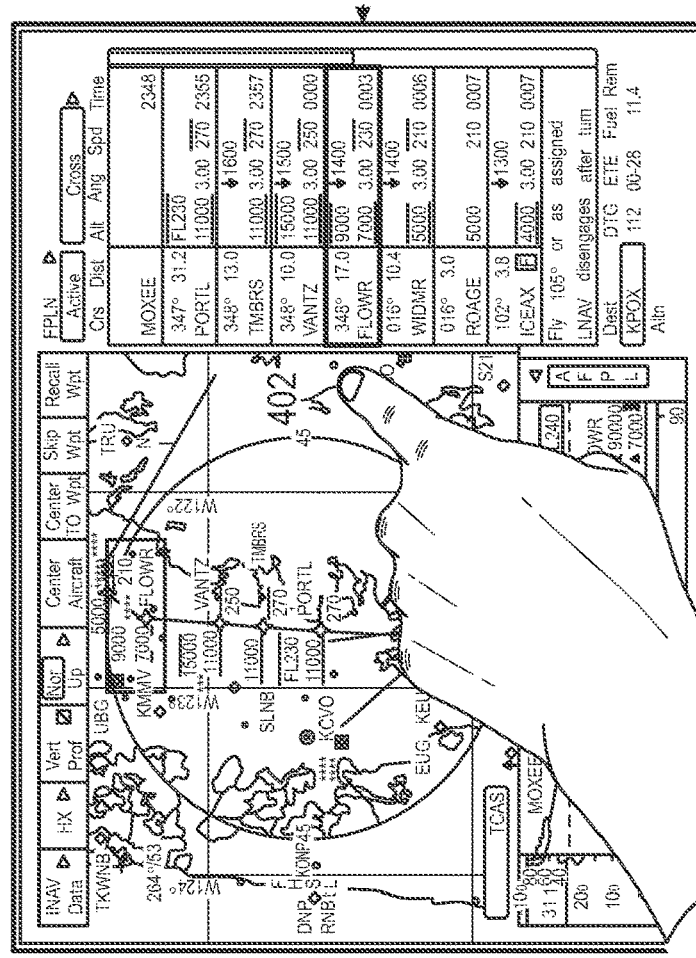
Figure 11:
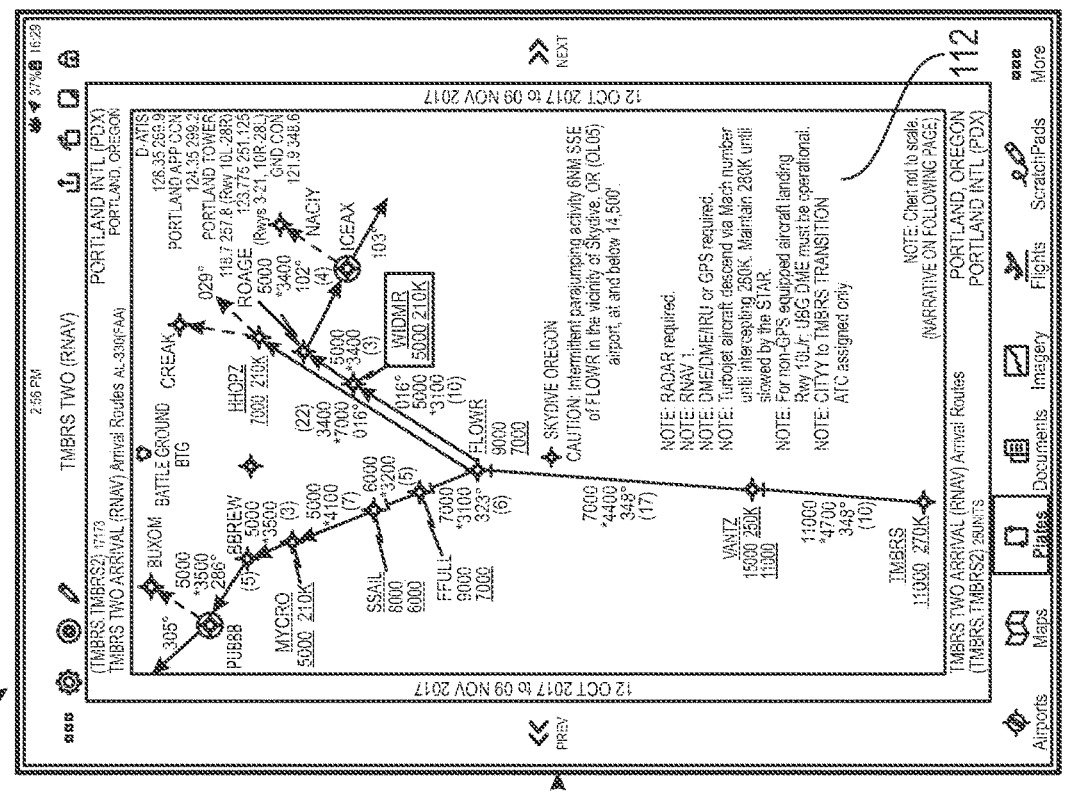
Figure 11:
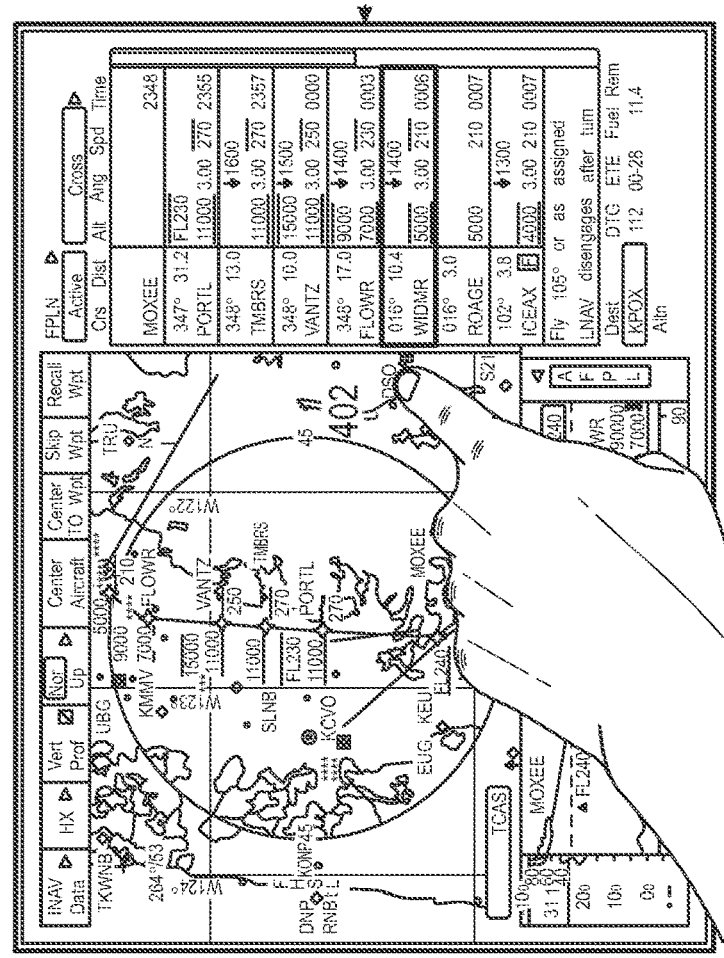
Figure 12:
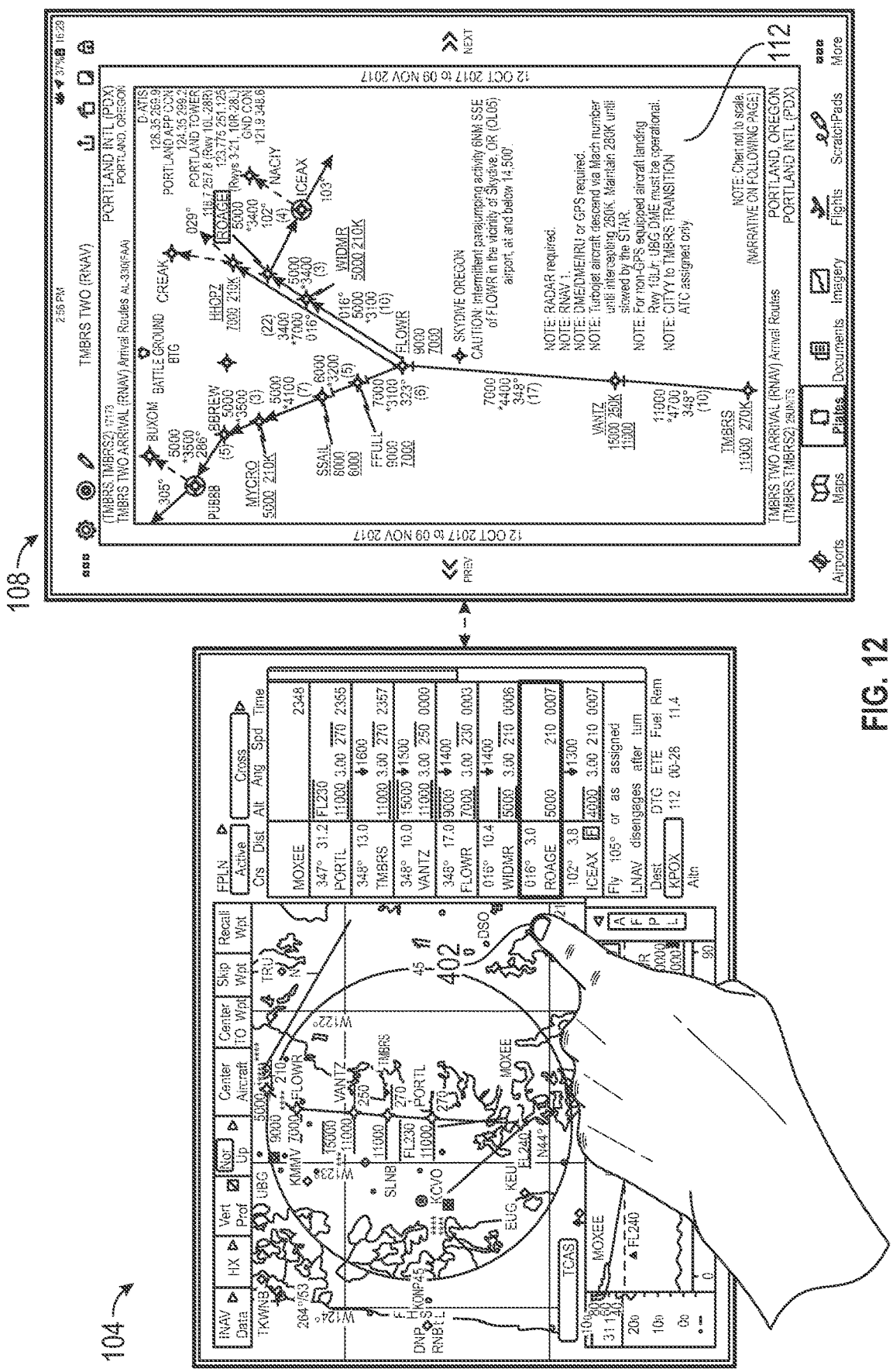
Figure 13:
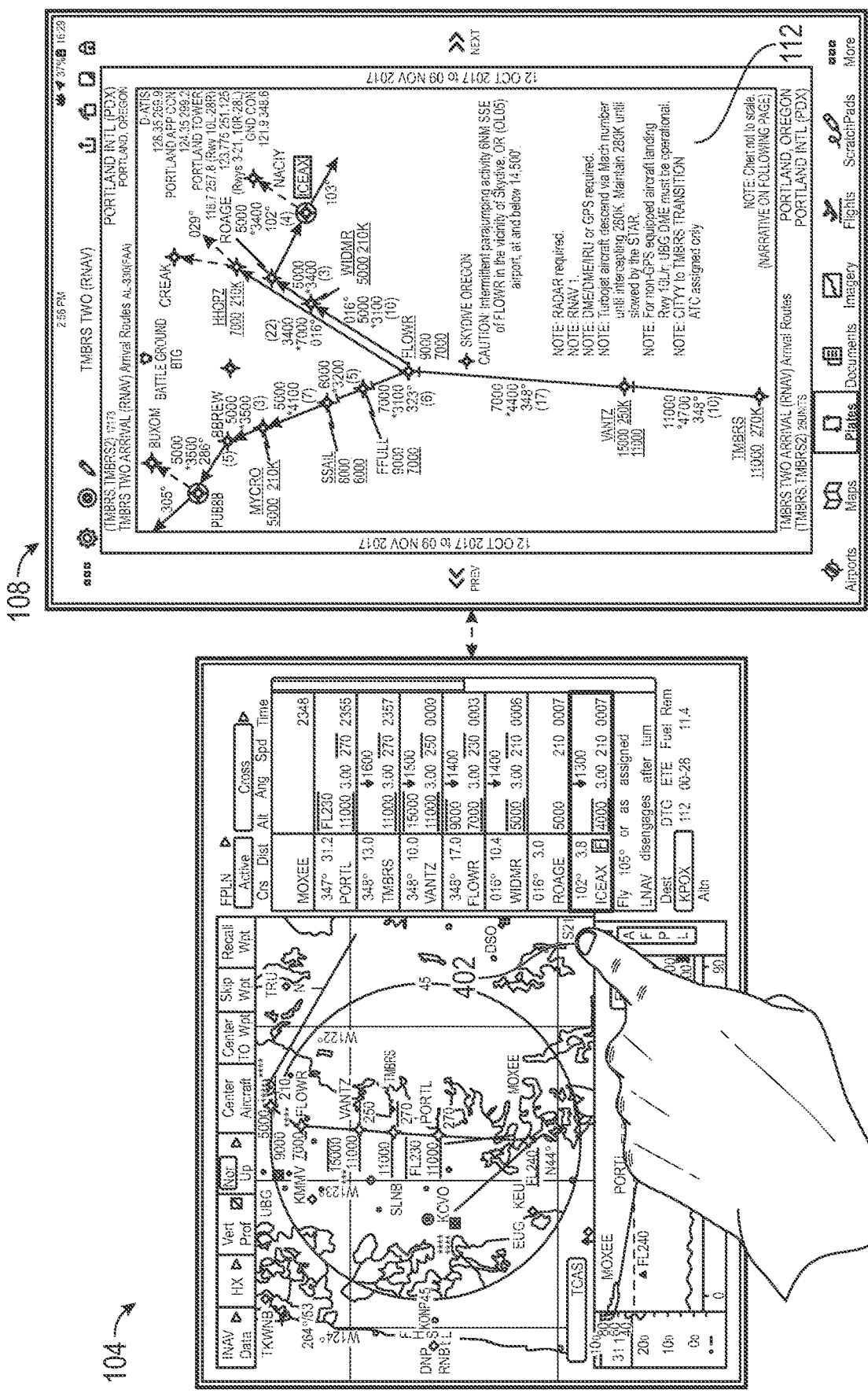

For example, in FIG. 9, the pilot/flight crew first selects the VANTZ waypoint. This waypoint and its associated constraints are then highlighted on both the flight deck display 104 and the device display 112. As FIGS. 10-13 illustrate, as the pilot/flight crew continues to select new waypoints and associated constraints, the selected waypoints and associated constraints are simultaneously highlighted on flight deck display 104 and the device display 112, providing a one-to-one connected placekeeping process that fits naturally within the context of current review and confirmation techniques.

It should be noted that although FIGS. 9-13 depict waypoint selection from the waypoint list 204, in some embodiments, the waypoints may be selected from the lateral situation display 206 and/or the vertical situation display 208.

It should additionally be noted that in some embodiments, the system may implement an error checking function. More specifically, the flight deck processor 106 may, in some embodiments, be additionally configured to compare the associated constraint(s) of the waypoint being simultaneously highlighted on the hand-held PED display device 112 and the flight deck display 104 to determine if there is a mismatch. If, based on this comparison, the flight deck processor 106 determines that there is a mismatch, it will generate an alert signal. The alert signal may be supplied to the flight deck display 104, which may, in response, generate a visual alert. For example, one flight deck display 104 ore the device display 112 (or both) may emphasize/highlight the discrepancy as the user's finger or the cursor is moved over the waypoint. In other embodiments, the alert signal may be supplied to one or more other devices 116 (only one depicted in FIG. 1) that may, for example, generate an audible alert, a visual alert, a haptic alert, or any combination thereof.

In other exemplary embodiments, the pilot/flight crew may begin the placekeeping process on the lateral situation display 206 or the vertical situation display 208, and placekeeping is accepted and connected across all other visualization perspectives and connected devices.

In still other exemplary embodiments, the placekeeping system 100 is configured to maintain the last known position across all devices (flight deck or hand-held PED 108), so if the confirmation task is interrupted, the pilot/flight crew has a reference point for where they left off.

The system 100 described herein provides a communication, collaboration, and confirmation aid for three distinct pilot/flight crew tasks that are used with every instrument procedure. These three tasks include: (1) loading and verifying the procedure; (2) briefing the procedure; and (3) flying the procedure. In the case of a single pilot crew, the pilot may use the interface alone, and review the entire procedure across the hand-held PED 108 and flight deck to catch any loading errors prior to engaging the autopilot. In the multi-pilot flight crew case, two crewmembers may use the system for coordinated placekeeping during the real-time execution of the briefing (i.e., the pilot listening sees in real time, on their own hand-held PED 108, where the pilot briefing is pointing on screen). In other cases, which may be referred to as a "fly-the-procedure" case, the crew may use the system 100 to double-check exactly one waypoint and its associated constraint(s), to ensure that what the aircraft is doing, and also what it is supposed to be doing according to the legal, visual, charted instrument procedure.

In one embodiment, a connected instrument procedure placekeeping system includes a navigation database, a flight deck display, a flight deck processor, and an electronic device. The navigation database has flight plan data stored therein. The flight deck display is coupled to receive image rendering display commands and is configured, in response thereto, to render images. The flight deck processor is in operable communication with the navigation database and the flight deck display. The flight deck processor is configured to selectively retrieve flight plan data from the navigation database. The retrieved flight plan data is representative of an instrument procedure that includes a plurality of waypoints and constraints. The flight deck processor is further configured to supply image rendering display commands to the flight deck display that causes the flight deck display to render images of the instrument procedure. The electronic device is in operable communication with the flight deck processor and is configured to simultaneously render an image of a published representation of the instrument procedure that is being rendered on the flight deck display. One of either the flight deck processor or the electronic device is responsive to user input signals to (i) cause a waypoint and its associated constraint of the rendered instrument procedure to be highlighted and (ii) supply data representative of the highlighted waypoint and its associated constraint to the other of the electronic device or the flight deck processor, respectively. The other of the electronic device or the flight deck processor is responsive to the supplied data to cause the waypoint and its associated constraint of the rendered instrument procedure to be simultaneously highlighted for ease of comparison.

These aspects and other embodiments may include one or more of the following features. The flight deck processor may be further configured to compare the associated constraint of the waypoint being highlighted on the electronic device and the flight deck display to determine if there is a mismatch, and generate an alert signal when there is a mismatch. The electronic device may comprise a flight deck display unit. The electronic device may a hand-held portable electronic device (PED) having a display device. The hand-held PED may be one of a smartphone, a tablet computer device, and an electronic flight bag. The display device may be configured as a touchscreen display device that is responsive to user input to generate and supply the user input signals. The system may further comprise a flight deck user interface in operable communication with the flight deck processor. The flight deck user interface may be coupled to receive user input and configured, in response thereto, to generate and supply the user input signals. The flight deck user interface may comprise one or more of a cursor control device and a keyboard. The flight deck display may be configured as a touchscreen display device that is responsive to user input to generate and supply the user input signals.

In another embodiment, a connected instrument procedure placekeeping system includes a navigation display, a flight deck display, a flight deck processor, and a hand-held personal electronic device (PED). The navigation database has flight plan data stored therein. The flight deck display is coupled to receive image rendering display commands and is configured, in response thereto, to render images. The flight deck processor is in operable communication with the navigation database and the flight deck display. The flight deck processor is configured to selectively retrieve flight plan data from the navigation database. The retrieved flight plan data is representative of an instrument procedure that includes a plurality of waypoints and constraints. The flight deck processor is further configured to supply image rendering display commands to the flight deck display that causes the flight deck display to render images of the instrument procedure. The hand-held PED includes a device display and is in operable communication with the flight deck processor and is configured to simultaneously render, on the device display, an image of a published representation of the instrument procedure that is being rendered on the flight deck display. The hand-held PED is responsive to user input signals to (i) cause a waypoint and its associated constraint of the rendered instrument procedure to be highlighted and (ii) supply data representative of the highlighted waypoint and its associated constraint to the flight deck processor. The flight deck processor is responsive to the supplied data to cause the waypoint and its associated constraint of the rendered instrument procedure to be simultaneously highlighted on the flight deck display for ease of comparison.

These aspects and other embodiments may include one or more of the following features. The hand-held PED may be one of a smartphone, a tablet computer device, and an electronic flight bag.

In yet another embodiment, a connected instrument procedure placekeeping system includes a navigation database, a flight deck display, a flight deck processor, and an electronic device. The navigation database has flight plan data stored therein. The flight deck display is coupled to receive image rendering display commands and is configured, in response thereto, to render images. The flight deck processor is in operable communication with the navigation database and the flight deck display. The flight deck processor is configured to selectively retrieve flight plan data from the navigation database. The retrieved flight plan data is representative of an instrument procedure that includes a plurality of waypoints and constraints. The flight deck processor is further configured to supply image rendering display commands to the flight deck display that causes the flight deck display to render images of the instrument procedure. The electronic device is in operable communication with the flight deck processor and is configured to simultaneously render an image of a published representation of the instrument procedure that is being rendered on the flight deck display. The flight deck processor is responsive to user input signals to (i) cause a waypoint and its associated constraint of the rendered instrument procedure to be highlighted and (ii) supply data representative of the highlighted waypoint and its associated constraint to the electronic device. The electronic device is responsive to the supplied data to cause the waypoint and its associated constraint of the rendered instrument procedure to be simultaneously highlighted on the display device for ease of comparison.

These aspects and other embodiments may include one or more of the following features. The flight deck processor may be further configured to compare the associated constraint of the waypoint being highlighted on the electronic device and the flight deck display to determine if there is a mismatch, and generate an alert signal when there is a mismatch. The system may further include a flight deck user interface in operable communication with the flight deck processor. The flight deck user interface may be coupled to receive user input and configured, in response thereto, to generate and supply the user input signals. The flight deck user interface may comprise one or more of a cursor control device and a keyboard. The flight deck display may be configured as a touchscreen display device that is responsive to user input to generate and supply the user input signals. The electronic device may be a hand-held personal electronic device (PED) that is selected from the group consisting of a smartphone, a tablet computer device, and an electronic flight bag.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A connected instrument procedure placekeeping system, comprising:
   a navigation database having flight plan data stored therein;
   a flight deck display coupled to receive image rendering display commands and configured, in response thereto, to render images;
   a flight deck processor in operable communication with the navigation database and the flight deck display, the flight deck processor configured to selectively retrieve flight plan data from the navigation database, the retrieved flight plan data representative of an instrument procedure that includes a plurality of waypoints and constraints, the flight deck processor further configured to supply image rendering display commands to the flight deck display that causes the flight deck display to render images of the instrument procedure; and
   an electronic device in operable communication with the flight deck processor and configured to simultaneously render an image of a published representation of the instrument procedure that is being rendered on the flight deck display,
   wherein:
      one of either the flight deck processor or the electronic device is responsive to user input signals to (i) cause a waypoint and its associated constraint of the rendered instrument procedure to be highlighted and (ii) supply data representative of the highlighted waypoint and its associated constraint to the other of the electronic device or the flight deck processor, respectively,
      the other of the electronic device or the flight deck processor is responsive to the supplied data to cause the waypoint and its associated constraint of the rendered instrument procedure to be simultaneously highlighted for ease of comparison; and
      the flight deck processor is further configured to:
         compare the associated constraint of the waypoint being highlighted on the electronic device and the flight deck display to determine if there is a mismatch; and
         generate an alert signal when there is a mismatch.

2. The system of claim 1, wherein the electronic device comprises a flight deck display unit.

3. The system of claim 1, wherein the electronic device comprises a hand-held portable electronic device (PED) having a display device.

4. The system of claim 3, wherein the hand-held PED is one of a smartphone, a tablet computer device, and an electronic flight bag.

5. The system of claim 3, wherein the display device is configured as a touchscreen display device that is responsive to user input to generate and supply the user input signals.

6. The system of claim 1, further comprising:
   a flight deck user interface in operable communication with the flight deck processor, the flight deck user interface coupled to receive user input and configured, in response thereto, to generate and supply the user input signals.

7. The system of claim 6, wherein the flight deck user interface comprises one or more of a cursor control device and a keyboard.

8. The system of claim 1, wherein:
   the flight deck display is configured as a touchscreen display device that is responsive to user input to generate and supply the user input signals.

9. A connected instrument procedure placekeeping system, comprising:
   a navigation database having flight plan data stored therein;
   a flight deck display coupled to receive image rendering display commands and configured, in response thereto, to render images;
   a flight deck processor in operable communication with the navigation database and the flight deck display, the flight deck processor configured to selectively retrieve flight plan data from the navigation database, the retrieved flight plan data representative of an instrument procedure that includes a plurality of waypoints and constraints, the flight deck processor further configured to supply image rendering display commands to the flight deck display that causes the flight deck display to render images of the instrument procedure; and a hand-held personal electronic device (PED) including a device display, the PED in operable communication with the flight deck processor and configured to simultaneously render, on the device display, an image of a published representation of the instrument procedure that is being rendered on the flight deck display, wherein:
the hand-held PED is responsive to user input signals to (i) cause a waypoint and its associated constraint of the rendered instrument procedure to be highlighted and (ii) supply data representative of the highlighted waypoint and its associated constraint to the flight deck processor, the flight deck processor is responsive to the supplied data to cause the waypoint and its associated constraint of the rendered instrument procedure to be simultaneously highlighted on the flight deck display for ease of comparison, and the flight deck processor is further configured to:
compare the associated constraint of the waypoint being highlighted on the hand-held PED display device and the flight deck display to determine if there is a mismatch; and
generate an alert signal when there is a mismatch.

10. The system of claim 9, wherein the hand-held PED comprises a smartphone.

11. The system of claim 9, wherein the hand-held PED comprises a tablet computer device.

12. The system of claim 9, wherein the hand-held PED comprises an electronic flight bag.

13. A connected instrument procedure placekeeping system, comprising:
a navigation database having flight plan data stored therein;
a flight deck display coupled to receive image rendering display commands and configured, in response thereto, to render images;
a flight deck processor in operable communication with the navigation database and the flight deck display, the flight deck processor configured to selectively retrieve flight plan data from the navigation database, the retrieved flight plan data representative of an instrument procedure that includes a plurality of waypoints and constraints, the flight deck processor further configured to supply image rendering display commands to the flight deck display that causes the flight deck display to render images of the instrument procedure; and an electronic device in operable communication with the flight deck processor and configured to simultaneously render an image of a published representation of the instrument procedure that is being rendered on the flight deck display, wherein:
the flight deck processor is responsive to user input signals to (i) cause a waypoint and its associated constraint of the rendered instrument procedure to be highlighted and (ii) supply data representative of the highlighted waypoint and its associated constraint to the electronic device, the electronic device is responsive to the supplied data to cause the waypoint and its associated constraint of the rendered instrument procedure to be simultaneously highlighted on the display device for ease of comparison, and the flight deck processor is further configured to:
compare the associated constraint of the waypoint being highlighted on the electronic device and the flight deck display to determine if there is a mismatch; and
generate an alert signal when there is a mismatch.

14. The system of claim 13, further comprising:
a flight deck user interface in operable communication with the flight deck processor, the flight deck user interface coupled to receive user input and configured, in response thereto, to generate and supply the user input signals.

15. The system of claim 14, wherein the flight deck user interface comprises one or more of a cursor control device and a keyboard.

16. The system of claim 13, wherein:
the flight deck display is configured as a touchscreen display device that is responsive to user input to generate and supply the user input signals.

17. The system of claim 13, wherein:
the electronic device is a hand-held personal electronic device (PED); and
the hand-held PED is selected from the group consisting of a smartphone, a tablet computer device, and an electronic flight bag.

* * * * *